(12) United States Patent
Mi et al.

(10) Patent No.: US 12,334,984 B2
(45) Date of Patent: Jun. 17, 2025

(54) OPTICAL TRANSMITTER AND OPTICAL MODULATION METHOD

(71) Applicant: HUAWEI TECHNOLOGIES CO., LTD., Guangdong (CN)

(72) Inventors: Guangcan Mi, Shenzhen (CN); Zeshan Chang, Shenzhen (CN); Tianhai Chang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 130 days.

(21) Appl. No.: 18/147,809

(22) Filed: Dec. 29, 2022

(65) Prior Publication Data

US 2023/0138252 A1 May 4, 2023

Related U.S. Application Data

(63) Continuation of application No. PCT/CN2021/101964, filed on Jun. 24, 2021.

(30) Foreign Application Priority Data

Jun. 30, 2020 (CN) .......................... 202010607552.4

(51) Int. Cl.
    *H04B 10/50*     (2013.01)
    *H04B 10/572*     (2013.01)
    *H04J 14/02*     (2006.01)

(52) U.S. Cl.
CPC ......... *H04B 10/506* (2013.01); *H04B 10/572* (2013.01); *H04B 10/50* (2013.01); *H04B 10/5053* (2013.01); *H04J 14/02* (2013.01)

(58) Field of Classification Search
CPC ................ H04B 10/506; H04B 10/572; H04B 10/503; H04B 10/516; H04B 10/50;
(Continued)

(56) References Cited

U.S. PATENT DOCUMENTS 6,388,782 B1    5/2002   Stephens et al.
9,703,048 B2 *   7/2017   Jiang ........................ G02B 6/35
(Continued)

FOREIGN PATENT DOCUMENTS

CN       102866876 A     1/2013
CN       110798265 A     2/2020
(Continued)

OTHER PUBLICATIONS

Office Action issued in CN202010607552.4, dated Jul. 5, 2022, 8 pages.
(Continued)

*Primary Examiner* — Dibson J Sanchez (57) ABSTRACT

An optical transmitter, including a wavelength selector and a plurality of modulator groups, is proposed. Each modulator group includes a plurality of modulators, and operating wavelengths of any two modulators in each modulator group are different. The wavelength selector is configured to: obtain a first beam from a multi-wavelength light source, and generate a second beam based on the first beam, where the second beam includes some of the plurality of wavelengths of the first beam. A modulator in a modulator group of the plurality of modulator groups is configured to modulate to-be-sent data onto a wavelength in the second beam.

19 Claims, 5 Drawing Sheets

(58) Field of Classification Search
CPC ....... H04B 10/5053; H04Q 2011/0009; H04Q 2011/0016; H04Q 11/0005; H04J 14/02
USPC .................................. 398/43–103, 182–201
See application file for complete search history.

(56) References Cited

U.S. PATENT DOCUMENTS

| | | | | |
|---|---|---|---|---|
| 9,954,618 | B1* | 4/2018 | Dong | H04B 10/5051 |
| 10,230,487 | B2* | 3/2019 | Hino | H04B 10/516 |
| 11,750,357 | B1* | 9/2023 | Zhang | H04B 10/61 398/155 |
| 2002/0186435 | A1* | 12/2002 | Shpantzer | H04B 10/506 398/99 |
| 2002/0191904 | A1* | 12/2002 | Kani | H04J 14/025 398/79 |
| 2003/0215233 | A1* | 11/2003 | Tomofuji | H04Q 11/0005 398/41 |
| 2004/0086220 | A1* | 5/2004 | Mino | G02F 1/3132 385/22 |
| 2012/0230690 | A1* | 9/2012 | Doerr | G02B 6/12033 385/11 |
| 2012/0230694 | A1* | 9/2012 | Tanaka | H04J 14/026 398/79 |
| 2012/0321306 | A1* | 12/2012 | Wellbrock | H04B 10/27 398/48 |
| 2013/0004163 | A1* | 1/2013 | Aoki | H04J 14/0256 398/34 |
| 2013/0058648 | A1* | 3/2013 | Ji | H04L 27/2096 398/38 |
| 2013/0251302 | A1* | 9/2013 | Bernasconi | H04B 10/516 385/3 |
| 2014/0205297 | A1* | 7/2014 | Cao | H04J 14/0227 398/79 |
| 2017/0010420 | A1* | 1/2017 | Jiang | G02B 6/29395 |
| 2017/0346589 | A1* | 11/2017 | Jiang | H04J 14/0275 |
| 2018/0062750 | A1* | 3/2018 | Grubb | H04B 10/506 |
| 2018/0083599 | A1* | 3/2018 | Kippenberg | H04J 14/02 |
| 2019/0020109 | A1* | 1/2019 | Puleri | H01Q 3/2676 |
| 2020/0343680 | A1* | 10/2020 | Lange | H04B 10/506 |

FOREIGN PATENT DOCUMENTS

| | | |
|---|---|---|
| EP | 1267510 A2 | 12/2002 |
| JP | 2003069502 A | 3/2003 |
| JP | 2005244261 A | 9/2005 |
| WO | 2017202204 A1 | 11/2017 |

OTHER PUBLICATIONS

Office Action issued in CN202010607552.4, dated Dec. 2, 2022, 9 pages.

Husain Shahad S et al: "Efficiency enhancement of phase-conjugated twin waves technique by shaping envelopes of subcarriers in all-optical OFDM systems", Optics Communications, Elsevier, Amsterdam, NL, vol. 472, Apr. 4, 2020 (Apr. 4, 2020), XP086156467, total 7 pages.

Vercesi Valeria et al: "Hitless multiwavelength source reconfiguration for flexible optical networks", 2015 International Conference on Optical Network Design and Modeling (ONDM), International Federation for Information Processing (IFIP), May 11, 2015 (may 11, 2015), pp. 145-150, XP032788795.

International Search Report and Written Opinion issued in PCT/CN2021/101964, dated Sep. 13, 2021, 10 pages.

Extended European Search Report issued in EP21833289.8, dated Nov. 7, 2023, 10 pages.

* cited by examiner

OPTICAL TRANSMITTER AND OPTICAL MODULATION METHOD

CROSS-REFERENCE TO RELATED APPLICATIONS

This application is a continuation of International Patent Application No. PCT/CN2021/101964, filed on Jun. 24, 2021, which claims priority to Chinese Patent Application No. 202010607552.4, filed on Jun. 30, 2020. The disclosures of the aforementioned applications are hereby incorporated by reference in their entireties.

TECHNICAL FIELD

Embodiments of the present disclosure relate to the optical communications field, and more specifically, to an optical transmitter and an optical modulation method.

BACKGROUND

Currently, an optical modulation technology in which an optical transmitter modulates data onto laser light to generate an optical signal to propagate in an optical fiber is known. The optical transmitter usually includes a light source and an optical modulator. The light source outputs continuous wave (CW) laser light used as a data carrier. The optical modulator modulates the data onto the laser light.

In a conventional technology, a laser with a fixed wavelength is used as a light source. In this case, in an optical signal forwarding process, a wavelength-insensitive optical cross connect (OXC) performs control, and implements optical signal forwarding by changing a connection relationship between OXC ports. However, an OXC port switching time usually reaches up to dozens of milliseconds. This can hardly meet a requirement for a low forwarding delay of the optical signal.

Therefore, a wavelength-sensitive OXC is provided, that is, a wavelength of a light source is tunable, so that a wavelength of an output optical signal can change based on a requirement. A physical connection relationship between ports of the OXC is fixed, there may be a connection relationship between each port and a plurality of ports, and a transmission path of the optical signal is determined by the wavelength of the optical signal. However, a wavelength adjustment time of a wavelength-tunable laser is still relatively long, and reaches up to seconds, and therefore a requirement for a low sending delay of the optical signal cannot be met. In addition, to obtain a sufficient wavelength adjustment range, currently, the wavelength-tunable laser usually adjusts a wavelength based on an external resonant cavity technology by changing a resonance wavelength of a resonant cavity, making component composition of the tunable laser more complex and a control circuit more complex. Therefore, costs are also much higher than those of a wavelength-fixed laser.

SUMMARY

The present disclosure provides an optical transmitter and an optical modulation method, so that a sending delay and a forwarding delay of an optical signal can be reduced, and costs of the optical transmitter can be reduced.

According to a first aspect, an optical transmitter is provided. The optical transmitter includes a wavelength selector and a plurality of modulator groups, each modulator group includes a plurality of modulators, and operating wavelengths of any two modulators in a same modulator group are different. The wavelength selector is configured to: obtain a first beam from a multi-wavelength light source, and generate a second beam based on the first beam. The first beam includes a plurality of wavelengths, and the second beam includes some of the plurality of wavelengths. A first modulator in a first modulator group is configured to modulate first to-be-sent data onto a first wavelength in the second beam. An operating wavelength of the first modulator includes the first wavelength.

The optical transmitter in the present disclosure may be applied to a wavelength-sensitive OXC. That is, a transmission path of an optical signal is determined by a wavelength of the optical signal, or a wavelength of an optical signal is a wavelength corresponding to a port of a receiving end of the optical signal, in other words, the wavelength of the optical signal meets a condition that the OXC can send, based on the wavelength of the optical signal, the signal to a receiving end to which data carried in the optical signal needs to be sent. In other words, the first wavelength is a wavelength corresponding to the first to-be-sent data, or the first wavelength is a wavelength corresponding to a receiving end of the first to-be-sent data, or the OXC can forward, based on the first wavelength, an optical signal carrying the first to-be-sent data to the receiving end to which the first to-be-sent data needs to be sent.

According to the optical transmitter provided in the present disclosure, the wavelength selector and the plurality of modulator groups are disposed, so that the wavelength selector can select, from the first beam including the plurality of wavelengths, the second beam including the first wavelength corresponding to the first to-be-sent data (or corresponding to the receiving end of the first to-be-sent data), and send the second beam to the first modulator group, and the first modulator that is in the first modulator group and whose operating wavelength includes the first wavelength can modulate the first to-be-sent data onto the first wavelength, in other words, can generate the optical signal that is of the first wavelength and that carries the first to-be-sent data. Therefore, a wavelength-sensitive OXC or the like can forward the optical signal to a target receiving end of the first to-be-sent data based on the first wavelength, so that a forwarding delay of the optical signal is reduced. In addition, a wavelength-tunable laser does not need to be used to meet a requirement of the wavelength-sensitive OXC, so that costs of the optical transmitter are reduced, a wavelength adjustment time is reduced, and a sending delay of the optical signal is reduced.

In an implementation, the wavelength selector and the plurality of modulator groups are integrated into a same chip. By way of an example but not a limitation, the chip includes a waveguide chip, that is, the wavelength selector and the modulator are waveguide components. In this way, integrated packaging of the optical transmitter can be implemented, so that practicality of the present disclosure is further improved.

Optionally, the first wavelength includes one wavelength. This case is applicable to a case of unicast transmission. Alternatively, the first wavelength includes a plurality of wavelengths. This case is applicable to a case of multicast or broadcast transmission.

In an implementation, the wavelength selector includes a plurality of cascaded unequal-arm Mach-Zehnder interferometers. In this case, the wavelength selector includes a plurality of output ports, the plurality of modulator groups is in one-to-one correspondence with the plurality of output ports, and each modulator group receives a beam from a corresponding output port. The wavelength selector is further configured to output the second beam from an output port corresponding to the first modulator group.

Optionally, the wavelength selector includes at least two operating states. Wavelengths of beams output from a same output port in different operating states are different. The optical transmitter further includes a first controller, configured to control an operating status of the wavelength selector, so that a wavelength of a beam output from the output port corresponding to the first modulator group includes the first wavelength.

For example, the wavelength selector includes a plurality of cascaded unequal-arm Mach-Zehnder interferometers. In this case, the first controller may control the operating status of the wavelength selector by controlling voltages applied to the Mach-Zehnder interferometers. In this way, the operating status of the wavelength selector can be easily controlled, so that practicality of the optical transmitter in the present disclosure can be further improved. In another implementation, the wavelength selector includes a plurality of filters and an optical switch. A first filter in the plurality of filters is configured to filter the first beam to generate the second beam. In other words, an operating wavelength of the first filter includes the first wavelength. The optical switch includes a plurality of input ports, the plurality of input ports is in one-to-one correspondence with the plurality of filters, and each input port is configured to receive a beam from a corresponding filter.

In an implementation, the plurality of filters and the optical switch are integrated into a same chip. For example, the chip may be a waveguide chip. It should be understood that the foregoing implementations are merely examples. The plurality of filters may be alternatively configured independently of the wavelength selector.

The optical switch includes a plurality of output ports, the plurality of output ports is in one-to-one correspondence with the plurality of modulator groups, and each of the plurality of modulator groups receives a beam from a corresponding output port. In this case, the optical switch is configured to output the second beam from the output port corresponding to the first modulator group.

Optionally, the optical switch includes at least two operating states. Wavelengths of beams output from a same output port in different operating states are different. In this case, the optical transmitter further includes the first controller, and the first controller is configured to control an operating status of the optical switch, so that the wavelength of the beam output from the output port corresponding to the first modulator group includes the first wavelength.

Optionally, the optical switch includes a plurality of Mach-Zehnder interferometers. In this case, the first controller may control the operating status of the optical switch by controlling the voltages applied to the Mach-Zehnder interferometers. In this way, the operating status of the optical switch can be easily controlled, so that practicality of the optical transmitter in the present disclosure can be further improved.

Optionally, each filter includes a plurality of filtering states, and beams output by a same filter in different filtering states include different wavelengths. In this case, the optical transmitter further includes a second controller, configured to control a filtering status of the first filter, so that a beam output by the first filter includes the first wavelength.

In an implementation, the first controller and the second controller may be a same controller, or the first controller and the second controller are jointly configured. In another implementation, the first controller and the second controller are independently configured.

Optionally, the first modulator includes a plurality of operating wavelengths, and the plurality of operating wavelengths are periodically distributed. The first wavelength belongs to the plurality of operating wavelengths.

Specifically, a resonance peak exists in an optical output spectrum of the first modulator, and the resonance peak has a periodic characteristic on the spectrum to form a free spectral range (FSR). The operating wavelength of the first modulator is set on a sidewall of the resonance peak.

Optionally, the optical transmitter further includes a third controller, configured to adjust a first parameter of the first modulator, so that the operating wavelength of the first modulator includes the first wavelength, and the first parameter includes an effective refractive index. The operating wavelength of the modulator is adjusted, so that a requirement on a quantity of modulators is reduced, and costs are reduced.

Optionally, the optical transmitter further includes the multi-wavelength light source.

In an implementation, one multi-wavelength light source generates the first beam. In another implementation, a plurality of multi-wavelength light sources separately generates a plurality of beams, the plurality of beams includes different wavelengths, and the plurality of beams are combined into the first beam by using a combiner component or the like.

According to a second aspect, an optical modulation method is provided. The method includes: generating a second beam based on a first beam, where the first beam includes a plurality of wavelengths, and the second beam includes some of the plurality of wavelengths; and modulating to-be-sent data onto a first wavelength in the second beam, where the first wavelength is a wavelength corresponding to a receiving device of the to-be-sent data.

According to the optical modulation method provided in the present disclosure, the second beam including the first wavelength corresponding to the first to-be-sent data (or corresponding to a receiving end of the first to-be-sent data) is selected from the first beam including the plurality of wavelengths, and the first to-be-sent data is modulated onto the first wavelength, in other words, an optical signal that is of the first wavelength and that carries the first to-be-sent data can be generated. Therefore, a wavelength-sensitive OXC or the like can forward the optical signal to a target receiving end of the first to-be-sent data based on the first wavelength, so that a forwarding delay of the optical signal is reduced. In addition, a wavelength-tunable laser does not need to be used to meet a requirement of the wavelength-sensitive OXC, so that costs of the optical transmitter are reduced, a wavelength adjustment time is reduced, and a sending delay of the optical signal is reduced.

Optionally, the first wavelength includes one wavelength. This case is applicable to a case of unicast transmission. Alternatively, the first wavelength includes a plurality of wavelengths. This case is applicable to a case of multicast or broadcast transmission.

Optionally, the generating a second beam based on a first beam includes: processing the first beam by using a wavelength selector to generate the second beam.

Optionally, the modulating to-be-sent data onto a first wavelength in the second beam includes: modulating the to-be-sent data onto the first wavelength in the second beam by using a first modulator in a plurality of modulators included in a first modulator group in a plurality of modulator groups. An operating wavelength of the first modulator includes the first wavelength.

Each modulator group includes a plurality of modulators, and operating wavelengths of any two modulators in a same modulator group are different.

In an implementation, the wavelength selector includes a plurality of cascaded unequal-arm Mach-Zehnder interferometers. In this case, the wavelength selector includes a plurality of output ports, the plurality of modulator groups is in one-to-one correspondence with the plurality of output ports, and each modulator group receives a beam from a corresponding output port. The method further includes: controlling the wavelength selector to output the second beam from an output port corresponding to the first modulator group.

Optionally, the wavelength selector includes at least two operating states. Wavelengths of beams output from a same output port in different operating states are different, and the controlling the wavelength selector to output the second beam from an output port corresponding to the first modulator group includes: controlling an operating status of the wavelength selector, so that a wavelength of a beam output from the output port corresponding to the first modulator group includes the first wavelength.

In another implementation, the wavelength selector includes a plurality of filters and an optical switch.

A first filter in the plurality of filters is configured to filter the first beam to generate the second beam.

The optical switch includes a plurality of input ports, the plurality of input ports is in one-to-one correspondence with the plurality of filters, and each input port is configured to receive a beam from a corresponding filter. In addition, the optical switch includes a plurality of output ports, the plurality of output ports is in one-to-one correspondence with the plurality of modulator groups, and each modulator group receives a beam from a corresponding output port. In this case, the processing the first beam by using a wavelength selector to generate the second beam includes: filtering the first beam by using the filter to generate the second beam.

Optionally, the filter includes a plurality of filtering states, and beams output by a same filter in different filtering states include different wavelengths. The method further includes: controlling a filtering status of the filter, so that a beam output by the filter includes the first wavelength. In this case, the controlling the wavelength selector to output the second beam from an output port corresponding to the first modulator group includes: controlling the optical switch to output the second beam from the output port corresponding to the first modulator group.

Optionally, the first modulator includes a plurality of operating wavelengths, and the plurality of operating wavelengths are periodically distributed. The first wavelength belongs to the plurality of operating wavelengths.

Optionally, the method further includes: adjusting a first parameter of the first modulator, so that the operating wavelength of the first modulator includes the first wavelength, and the first parameter includes an effective refractive index.

According to a third aspect, a method for controlling an optical transmitter is provided. The optical transmitter includes a wavelength selector and a plurality of modulator groups, each modulator group includes a plurality of modulators, and operating wavelengths of any two modulators in a same modulator group are different. The method includes: controlling the wavelength selector to generate a second beam based on a first beam obtained from a multi-wavelength light source, where the first beam includes a plurality of wavelengths, and the second beam includes some of the plurality of wavelengths; and controlling a first modulator in a first modulator group to modulate first to-be-sent data onto a first wavelength in the second beam. An operating wavelength of the first modulator includes the first wavelength.

The first wavelength is a wavelength corresponding to the first to-be-sent data, or the first wavelength is a wavelength corresponding to a receiving end of the first to-be-sent data, or an OXC can forward, based on the first wavelength, an optical signal carrying the first to-be-sent data to the receiving end to which the first to-be-sent data needs to be sent.

According to the method provided in the present disclosure, the wavelength selector and the plurality of modulator groups are disposed, so that the wavelength selector can select, from the first beam including the plurality of wavelengths, the second beam including the first wavelength corresponding to the first to-be-sent data (or corresponding to the receiving end of the first to-be-sent data), and send the second beam to the first modulator group, and the first modulator that is in the first modulator group and whose operating wavelength includes the first wavelength can modulate the first to-be-sent data onto the first wavelength, in other words, can generate the optical signal that is of the first wavelength and that carries the first to-be-sent data. Therefore, a wavelength-sensitive OXC or the like can forward the optical signal to a target receiving end of the first to-be-sent data based on the first wavelength, so that a forwarding delay of the optical signal is reduced. In addition, a wavelength-tunable laser does not need to be used to meet a requirement of the wavelength-sensitive OXC, so that costs of the optical transmitter are reduced, a wavelength adjustment time is reduced, and a sending delay of the optical signal is reduced.

For descriptions of some specific feasible manners and beneficial effects, refer to the descriptions of specific implementations of the first aspect and the second aspect. Details are not described herein again.

With reference to the first aspect to the third aspect and the possible implementations of the first aspect to the third aspect, in a possible implementation, one multi-wavelength light source generates the first beam.

With reference to the first aspect to the third aspect and the possible implementations of the first aspect to the third aspect, in another implementation, a plurality of multi-wavelength light sources separately generates a plurality of beams, the plurality of beams includes different wavelengths, and the plurality of beams is combined into the first beam by using a combiner component or the like.

DESCRIPTION OF EMBODIMENTS

The following describes technical solutions of the present disclosure with reference to the accompanying drawings.

Figure 1:
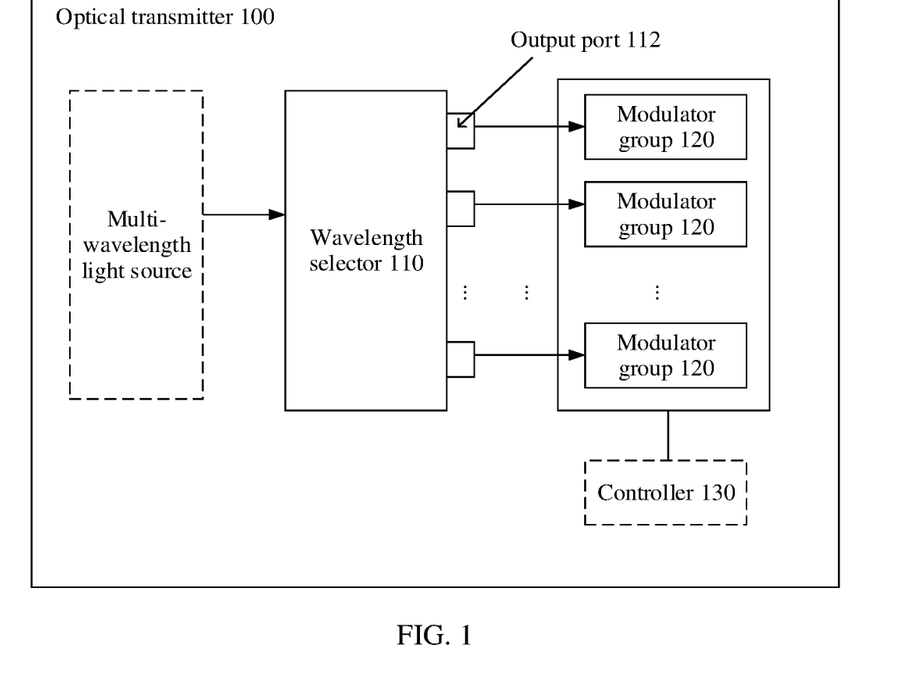
FIG. 1 is a schematic diagram of an example of a structure of an optical transmitter according to the present disclosure.

FIG. 1 shows a structure of an optical transmitter 100 according to the present disclosure. As shown in FIG. 1, the optical transmitter 100 includes a wavelength selector 110 and a plurality of modulator groups 120. The wavelength selector 110 includes a plurality of output ports 112. The plurality of output ports 112 are in one-to-one correspondence with the plurality of modulator groups 120, and there is an optical communication connection between each output port 112 and a corresponding modulator group, in other words, a beam output from one output port 112 can be transmitted to a modulator group of the output port 112.

Each modulator group 120 includes a plurality of modulators. Operating wavelengths of any two modulators in each modulator group are different. The modulator is configured to modulate data or information onto an input beam, and specifically, modulate the data or the information onto a wavelength that is in the beam and that matches an operating wavelength of the modulator, so that an optical signal is generated.

It should be noted that the modulator may also be referred to as an optical modulator, configured to convert an input electrical signal into an optical signal, and inject the optical signal into a fiber line to the greatest extent by using a coupling technology. A process of converting the electrical signal into the optical signal is optical modulation. The modulator in the present disclosure may include but is not limited to an acousto-optic modulator, a magneto-optic modulator, an electro-optic modulator, an electro-absorption modulator, or the like.

The electro-optic modulator implements optical modulation because a refractive index of an electro-optical crystal (for example, lithium niobate) changes with an external electric field, namely, an electro-optic effect, that is, a refractive index, an absorption rate, amplitude, or a phase of output light is finally controlled by a change of a voltage or the electric field. By way of an example but not a limitation, in the present disclosure, the electro-optic modulator may be a microring modulator, a Mach-Zehnder interferometer (MZI) modulator, or a modulator using bulk materials.

The magneto-optic modulator implements optical modulation because a polarization plane of light may rotate under the action of a magnetic field when the light passes through a magneto-optic crystal (for example, yttrium iron garnet). The acousto-optic modulator implements optical modulation because a material (for example, lithium niobate) is strained under the action of an acoustic wave and a refractive index changes, namely, a photoelastic effect. A waveguide optical modulator implements electro-optic, magneto-optic, or acousto-optic modulation by producing a thin film optical waveguide on a substrate by using an integrated optical technology.

In the present disclosure, the modulator has an operating wavelength, that is, the modulator can modulate data onto a beam including a wavelength that matches (for example, is the same as) the operating wavelength of the modulator.

Figure 2:
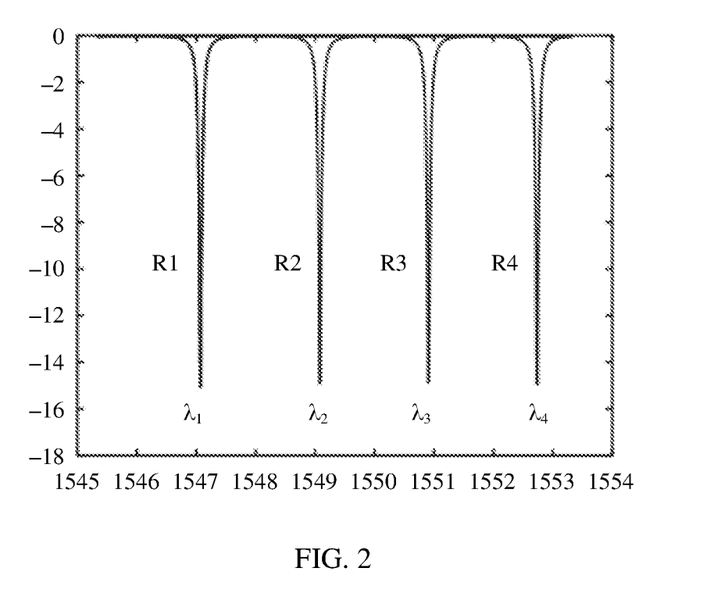
FIG. 2 is a schematic diagram of an example of output spectrums of a plurality of modulators in a same modulator group.
Figure 3:
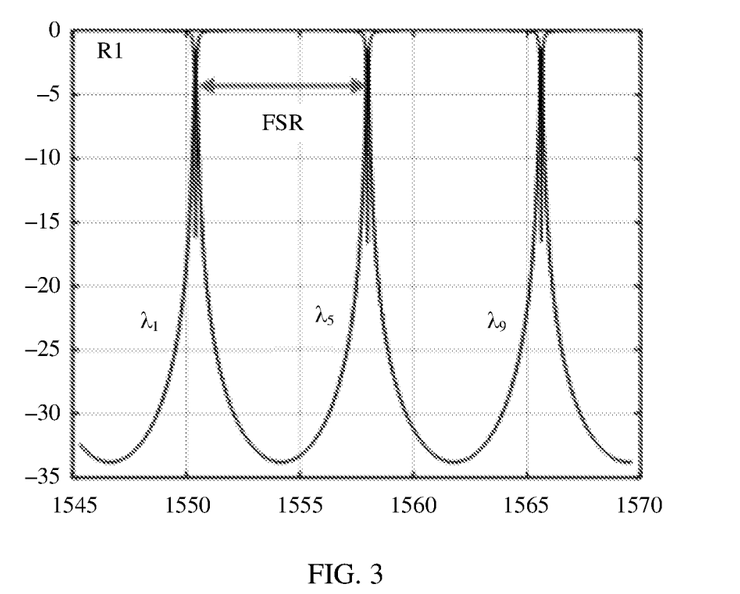
FIG. 3 is a schematic diagram of an example of an output spectrum of one modulator.

FIG. 2 and FIG. 3 are schematic diagrams of a spectrum of an output optical signal (namely, a modulated optical signal) of a modulator. As shown in FIG. 2, for example, when a microring modulator is used as the modulator in the present disclosure, an optical signal output by each modulator has a resonance peak. The operating wavelength of the modulator is set near the resonance peak, for example, on a sidewall of the resonance peak. Therefore, if a wavelength of a beam input to the modulator (for example, a microring modulator) does not meet an operating wavelength condition, the modulator does not modulate data onto the beam.

It should be understood that a manner of setting the operating wavelength shown in FIG. 2 is merely an example for description, and does not constitute a limitation on the present disclosure, and the operating wavelength of the modulator may change with a type of the modulator accordingly.

In an implementation, an operating status of the modulator (or the operating wavelength of the modulator) may be adjusted, so that the operating wavelength of the modulator matches the wavelength of the input beam, thereby implementing modulation of input light.

By way of an example but not a limitation, an effective refractive index of a waveguide of the modulator (for example, a microring modulator or an MZI modulator) may be changed by using a thermo-optic effect, so that the operating wavelength of the modulator is changed. That is, optionally, the optical transmitter 100 may further include a controller 130 (namely, an example of a third controller). The controller 130 may determine a wavelength corresponding to to-be-sent data (or to-be-modulated data). Specifically, the optical transmitter 100 in the present disclosure may be applied to an optical switching network that is based on a wavelength-sensitive OXC. The wavelength corresponding to the to-be-sent data may be understood as a wavelength corresponding to a receiving end of the to-be-sent data. In other words, the optical switching network can transmit the to-be-sent data to the receiving end of the to-be-sent data based on the wavelength corresponding to the to-be-sent data.

The controller 130 may determine whether an operating wavelength of each modulator in each modulator group in the optical transmitter 100 includes the wavelength corresponding to the to-be-sent data. For example, the controller 130 may determine an initial operating wavelength of each modulator in each modulator group through user input, factory setting, or the like, and update and record an updated operating wavelength of the modulator each time the operating wavelength is adjusted.

If operating wavelengths of the modulators do not include the wavelength corresponding to the to-be-sent data, the controller 130 may further adjust operating wavelengths of one or more modulators in one or more modulator groups, so that an adjusted operating wavelength of at least one modulator includes the wavelength corresponding to the to-be-sent data.

Wavelengths $\lambda_1$, $\lambda_2$, $\lambda_3$, and $\lambda_4$ are respectively set for modulators R1, R2, R3, and R4 shown in FIG. 2, and spacings between the four wavelengths are not equal to integer multiples of an FSR. Therefore, each of the four modulators modulates only an optical signal whose wavelength matches an operating wavelength of the modulator, and does not modulate optical signals whose wavelengths match operating wavelengths of the other three modulators.

In the present disclosure, one modulator may include a plurality of operating wavelengths. Specifically, as shown in FIG. 3, an output optical signal of the modulator has a periodic characteristic on a spectrum. Specifically, a resonance peak of the output optical signal has the periodic characteristic on the spectrum to form a free spectral range (FSR). Assuming that a wavelength $\lambda_i$ meets an operating wavelength condition of the modulator, when a wavelength $\lambda_j$ of an input beam of the modulator meets $\lambda_j=\lambda_i+k*FSR$, and k is an integer, the wavelength of the input beam meets the operating wavelength condition of the microring modulator, and may be used for modulation by the modulator.

It should be understood that the periodic characteristic shown in FIG. 3 is merely an example, and the present disclosure is not limited thereto. When another type of modulator (for example, an MZI modulator) is used, a frequency of an output optical signal does not have a resonance peak, but the frequency of the output optical signal also has the periodic characteristic.

In this case, assuming that the optical transmitter 100 includes four modulator groups, and sets of operating wavelengths of modulators included in all of the four modulator groups are $\{\lambda_1, \lambda_2, \lambda_3, \lambda_4\}$, $\{\lambda_5, \lambda_6, \lambda_7, \lambda_8\}$, $\{\lambda_9, \lambda_{10}, \lambda_{11}, \lambda_{12}\}$, and $\{\lambda_{13}, \lambda_{14}, \lambda_{15}, \lambda_{16}\}$, in a possible implementation, a spacing between wavelengths at corresponding locations (for example, a same location) in any two sets is an integer multiple of the FSR. For example, a spacing between any two of $\lambda_1, \lambda_5, \lambda_9,$ and $\lambda_{13}$ is an integer multiple of the FSR. In this case, the four modulator groups include same modulators, so that a difficulty in configuring the modulator groups can be reduced, thereby further improving practicality of the present disclosure.

Figure 4:
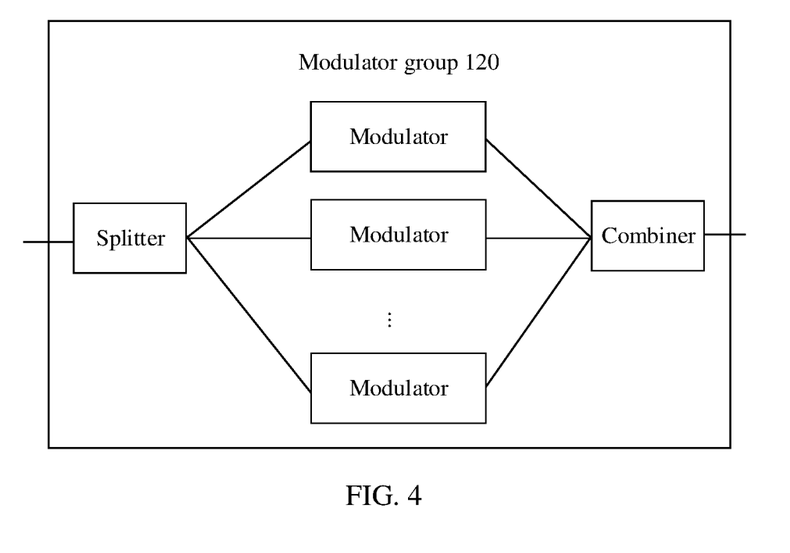
FIG. 4 is a schematic diagram of a configuration manner of a plurality of modulators in one modulator group according to the present disclosure.

FIG. 4 is a schematic diagram of an example of a configuration of modulators in a modulator group according to the present disclosure. As shown in FIG. 4, a plurality of modulators in a same modulator group may be connected in series, that is, a beam input to the modulator group sequentially passes through the modulators in the modulator group, and each modulator modulates to-be-sent data onto a wavelength that is in the beam and that matches an operating wavelength of the modulator. The configuration manner of the modulator group shown in FIG. 4 may be applied to a scenario in which a microring modulator or the like is used as the modulator in the present disclosure.

Figure 5:
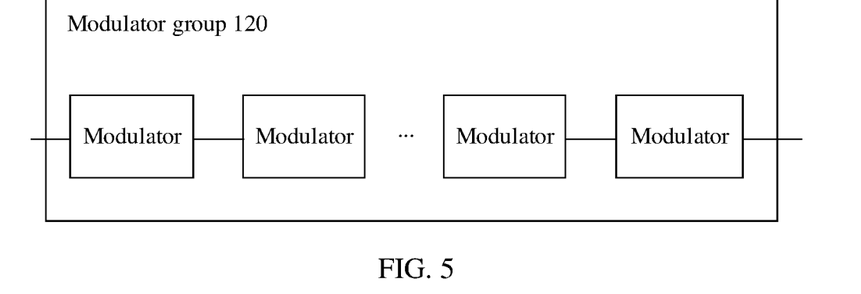
FIG. 5 is a schematic diagram of another configuration manner of a plurality of modulators in one modulator group according to the present disclosure.

FIG. 5 is a schematic diagram of another example of a configuration of modulators in a modulator group according to the present disclosure. As shown in FIG. 5, a plurality of modulators in a same modulator group may be connected in parallel. That is, a beam input to the modulator group may be separately input to the modulators in the modulator group by using a component such as a splitter. In addition, each modulator modulates to-be-sent data onto a wavelength that is in the beam and that matches an operating wavelength of the modulator, and beams output from the modulators are combined by using a combiner or the like.

In the present disclosure, different modulator groups may include a same quantity or different quantities of modulators. This is not specifically limited in the present disclosure.

In addition, some or all of the plurality of modulator groups of the optical transmitter 100 may include one or more modulators with a same operating wavelength. Alternatively, some or all of the plurality of modulator groups of the optical transmitter 100 may not include modulators with a same operating wavelength.

In addition, the configurations of the modulators shown in FIG. 4 and FIG. 5 are merely examples for description, and the present disclosure is not limited thereto. For example, each modulator may further include (or correspond to) one or more filters, and the filter may be configured to obtain a wavelength that matches an operating wavelength of the modulator from an input beam.

The following describes a structure and a function of the wavelength selector 110. In the present disclosure, the wavelength selector 110 includes two functions.

Function 1: Obtain one or more beams based on a beam (which is denoted as a beam #1 for ease of understanding and description, namely, an example of a first beam) received from a multi-wavelength light source. When a plurality of beams are obtained, processing processes of the beams are similar. Herein, to avoid repetition, a processing process of one beam (which is denoted as a beam #2 for ease of understanding and description, namely, an example of a second beam) is used as an example for description.

Function 2: Transmit the beam #2 to a modulator group #1 in the plurality of modulator groups. An operating wavelength of a modulator in the modulator group #1 includes a wavelength corresponding to to-be-sent data, and the beam #2 includes the wavelength corresponding to the to-be-sent data.

By way of an example but not a limitation, wavelength selectors 110 that have either of the following structures and that can implement the foregoing functions may be described.

Structure 1

Figure 6:
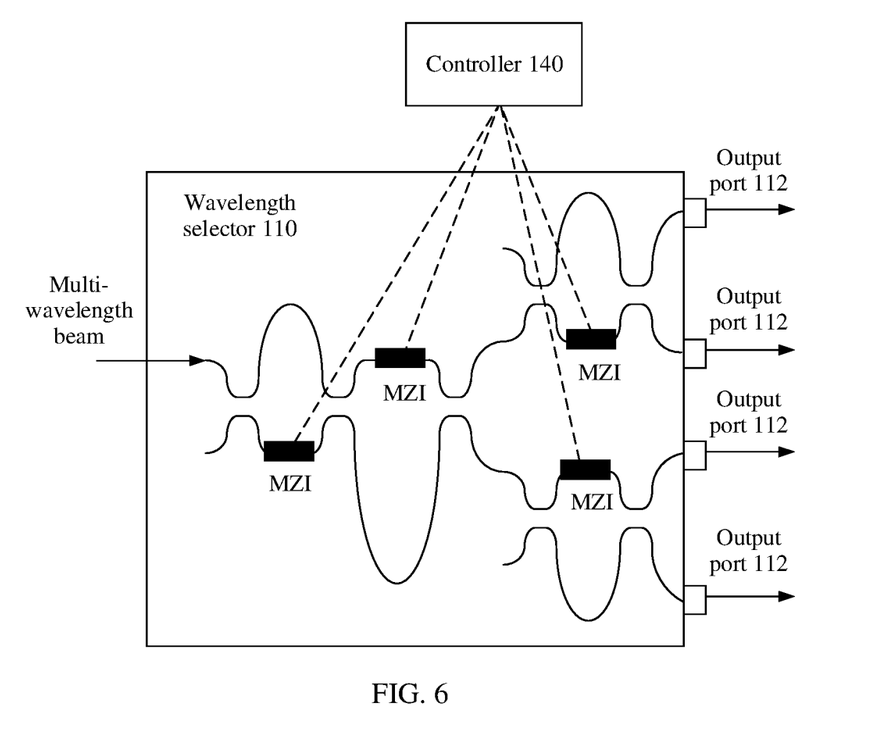
FIG. 6 is a schematic diagram of an implementation of a wavelength selector according to the present disclosure.

FIG. 6 shows an example of the wavelength selector 110 according to the present disclosure. As shown in FIG. 6, the wavelength selector 110 includes a plurality of cascaded unequal-arm MZI. In addition, an electro-optic phase shifter with a nanosecond (NS)-level response speed is provided on a tuning arm of the MZI. That is, the foregoing two functions of the wavelength selector 110 can be completed by using the plurality of cascaded unequal-arm MZIs shown in FIG. 6.

Assuming that the beam #1 includes 16 wavelengths, namely, $\lambda_1$ to $\lambda_{16}$, in an implementation, the wavelength selector 110 may classify the 16 wavelengths into four groups, in other words, the beam #2 includes four wavelengths.

In addition, in the present disclosure, the beam #2 can be transmitted to different optical modulator groups by changing a configuration status of the cascaded MZIs. That is, in a configuration state #1 of the cascaded MZIs, $\lambda_1$ to $\lambda_4$ are transmitted to an optical modulator group #1, in a configuration state #2 of the cascaded MZIs, $\lambda_1$ to $\lambda_4$ are transmitted to an optical modulator group #2, in a configuration state #3 of the cascaded MZIs, $\lambda_1$ to $\lambda_4$ are transmitted to an optical modulator group #3, and in a configuration state #4 of the cascaded MZIs, $\lambda_1$ to $\lambda_4$ are transmitted to an optical modulator group #4.

By way of an example but not a limitation, the configuration status of the cascaded MZIs may be changed by changing voltages applied to the cascaded MZIs. That is, optionally, the optical transmitter 100 may further include a controller 140 (namely, an example of a first controller). The controller 140 may determine a wavelength corresponding to to-be-sent data (or to-be-modulated data).

In addition, the controller 140 determines a modulator group (denoted as a modulator group #A) that is in the optical transmitter 100 and whose operating wavelength includes the wavelength corresponding to the to-be-sent data. Then the controller 140 changes the configuration status of the cascaded MZIs (for example, by changing the voltages applied to the cascaded MZIs), so that a beam that is selected by the wavelength selector 110 from the beam #1 and that includes the wavelength corresponding to the to-be-sent data is transmitted to the modulator group #A.

Structure 2

Figure 7:
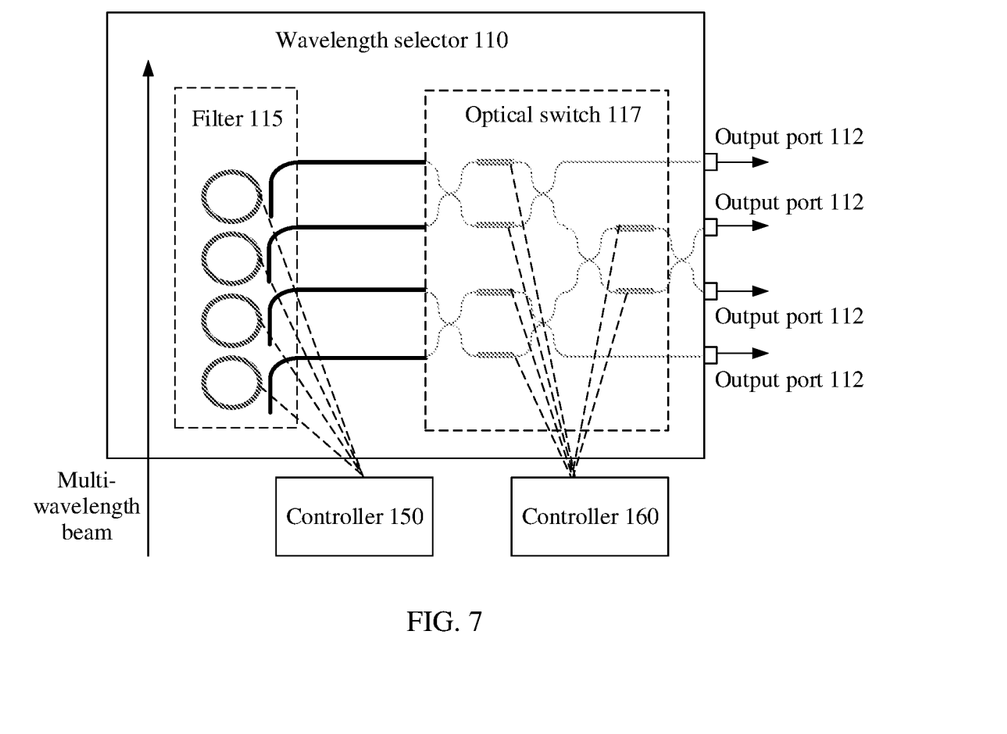
FIG. 7 is a schematic diagram of another implementation of a wavelength selector according to the present disclosure.

FIG. 7 shows an example of the wavelength selector 110 according to the present disclosure. As shown in FIG. 7, the wavelength selector 110 includes a plurality of filters 115 and an optical switch 117.

The plurality of filters are configured to implement the foregoing function 1. That is, each filter 115 may filter the beam #1 to obtain a beam including a wavelength corresponding to (for example, the same as) a filtering wavelength of the filter.

By way of an example but not a limitation, the filter 115 may include a microring filter.

In an implementation, a filtering status of the filter 115 (or a filtering wavelength of the filter) may be adjusted, so that the filtering wavelength of the filter matches a wavelength corresponding to to-be-sent data. That is, optionally, the optical transmitter 100 may further include a controller 150 (namely, an example of a second controller). The controller 150 may determine the wavelength corresponding to the to-be-sent data (or to-be-modulated data).

In addition, the controller 150 may determine whether a filtering wavelength of each filter in the optical transmitter 100 includes the wavelength corresponding to the to-be-sent data. For example, the controller 150 may determine an initial operating wavelength of each filter through user input, factory setting, or the like, and update and record an updated operating wavelength of the filter each time the filtering wavelength is adjusted.

If filtering wavelengths of the filters do not include the wavelength corresponding to the to-be-sent data, the controller 150 may further adjust operating wavelengths of one or more filters, so that an adjusted filtering wavelength of at least one filter includes the wavelength corresponding to the to-be-sent data. Therefore, it can be ensured that a wavelength of at least one of beams output by the wavelength selector 110 includes the wavelength corresponding to the to-be-sent data.

In addition, the optical switch 117 is configured to implement the foregoing function 2. Specifically, assuming that the wavelength selector 110 includes N filters, and the optical transmitter includes M optical modulator groups, the optical switch 117 may be an optical switch of N*M. That is, a beam output by any one of the N filters can be transmitted to any optical modulator in the M optical modulator groups by controlling an operating status of the wavelength selector 110.

By way of an example but not a limitation, a function of the optical switch 117 may be implemented through cooperative operation of a plurality of MZIs.

In the present disclosure, the beam #2 can be transmitted to different optical modulator groups by changing a configuration status of the optical switch 117 (for example, cascaded MZIs). That is, in a configuration state #1 of the cascaded MZIs, $\lambda_1$ to $\lambda_4$ are transmitted to an optical modulator group #1, in a configuration state #2 of the cascaded MZIs, $\lambda_1$ to $\lambda_4$ are transmitted to an optical modulator group #2, in a configuration state #3 of the cascaded MZIs, $\lambda_1$ to $\lambda_4$ are transmitted to an optical modulator group #3, and in a configuration state #4 of the cascaded MZIs, 21 to 24 are transmitted to an optical modulator group #4.

By way of an example but not a limitation, the configuration status of the cascaded MZIs may be changed by changing voltages applied to the cascaded MZIs. That is, optionally, the optical transmitter 100 may further include a controller 160 (namely, an example of a first controller). The controller 160 may determine the wavelength corresponding to the to-be-sent data (or to-be-modulated data).

In addition, the controller 160 determines a modulator group (denoted as a modulator group #A) that is in the optical transmitter 100 and whose operating wavelength includes the wavelength corresponding to the to-be-sent data. Then the controller 160 changes the configuration status of the cascaded MZIs (for example, by changing the voltages applied to the cascaded MZIs), so that a beam that is selected by the wavelength selector 110 from the beam #1 and that includes the wavelength corresponding to the to-be-sent data is transmitted to the modulator group #A.

It should be understood that the foregoing structures of the optical transmitter 100 are merely examples for description, and the present disclosure is not limited thereto.

For example, the optical transmitter 100 may further include a light source, and the light source is configured to generate a multi-wavelength beam, namely, the beam #1.

In an implementation, there may be one light source. In another implementation, there may be a plurality of light sources, and each light source is configured to generate some wavelengths in the beam #1. In addition, in this case, the optical transmitter 100 may further include a combiner (not shown in the figure), and the combiner is configured to combine beams generated by the light sources to generate the beam #1.

For another example, the optical transmitter 100 may include a plurality of wavelength selectors. A structure and a function of each of the plurality of wavelength selectors are similar to those of the foregoing wavelength selector 110. To avoid repetition, detailed descriptions thereof are omitted herein.

In an implementation, the plurality of wavelength selectors may share one light source 170. In another implementation, each wavelength selector corresponds to one or more light sources, and each wavelength selector receives beams from the one or more corresponding light sources.

It should be noted that the foregoing controllers 140 to 160 may be jointly configured. In other words, the controllers 140 to 160 may be implemented by using one controller.

Alternatively, the controllers 140 to 160 may be independently configured. This is not specifically limited in the present disclosure. In addition, in the present disclosure, the optical transmitter 100 may be implemented by using a waveguide integrated optical technology or the like, that is, the wavelength selector 110 and the modulator group 120 are integrated into a same chip.

Figure 8:
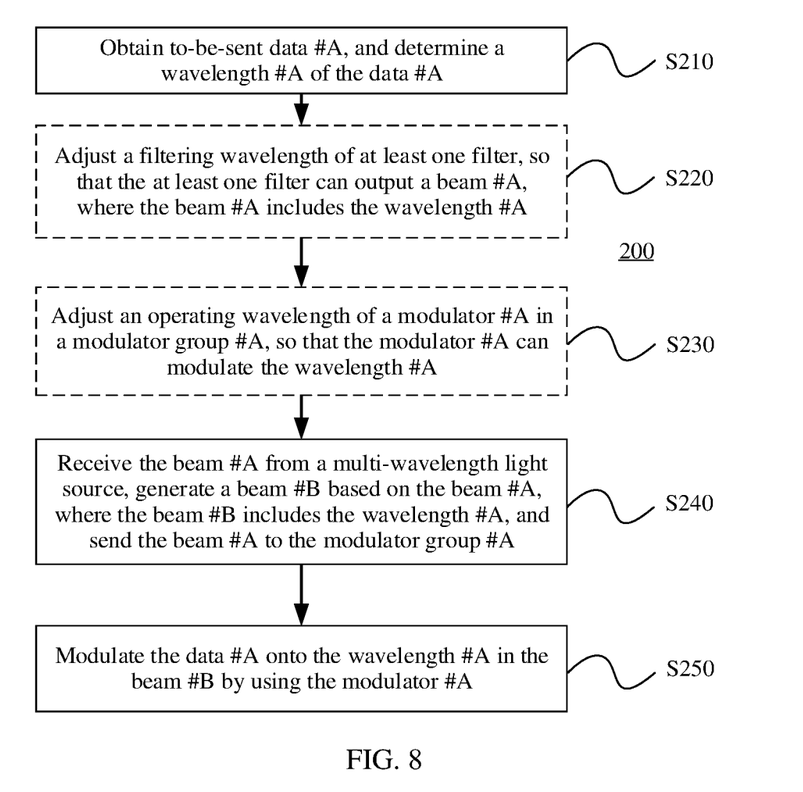
FIG. 8 is a schematic flowchart of an example of an optical modulation method according to the present disclosure.

FIG. 8 is a schematic flowchart of an optical modulation method 200 according to the present disclosure. As shown in FIG. 8, in S210, an optical transmitter 100 (for example, a controller or a processor in the optical transmitter 100) obtains to-be-sent data (denoted as data #A) from a computing node, and determines a wavelength #A corresponding to the data #A. For example, an optical signal of the wavelength #A can be transmitted to a receiving end based on a wavelength-sensitive OXC.

In an implementation, information about the wavelength #A may be determined and notified to the optical transmitter 100 by a computing node in which the optical transmitter 100 is configured. In another implementation, a user or an administrator may configure a correspondence between a plurality of wavelengths and a plurality of computing nodes in the optical transmitter 100. Therefore, the optical transmitter 100 can determine, as the wavelength #A, a wavelength that is in the correspondence and that corresponds to a computing node used as a receiving end of the data #A.

In S240, a wavelength selector 110 of the optical transmitter 100 receives a beam #A from a multi-wavelength light source, and generates a beam #B based on the beam #A, and in addition, the optical transmitter 100 (for example, a controller or a processor in the optical transmitter 100) controls an operating status of the wavelength selector 110 to send the beam #A to a modulator group #A. The beam #B includes the beam #A, and an operating wavelength of a modulator #A in the modulator group #A includes the wavelength #A.

Optionally, when a structure of the wavelength selector 110 is the foregoing structure 2, in S220, the optical transmitter 100 (for example, a controller or a processor in the optical transmitter 100) determines whether a filtering wavelength of each filter 115 includes the wavelength #A, or the optical transmitter 100 (for example, a controller or a processor in the optical transmitter 100) determines whether at least one filter 115 that can output a beam including the wavelength #A exists. If filtering wavelengths of the filters 115 do not include the wavelength #A, the optical transmitter 100 (for example, a controller or a processor in the optical transmitter 100) may adjust a filtering wavelength of at least one filter 115, so that the at least one filter 115 can output the beam #A. The beam #A includes the wavelength #A.

Optionally, in S230, the optical transmitter 100 (for example, a controller or a processor in the optical transmitter 100) determines whether an operating wavelength of each modulator in each modulator group 120 includes the wavelength #A, or the optical transmitter 100 (for example, a controller or a processor in the optical transmitter 100) determines whether at least one modulator that can modulate the wavelength #A exists. If operating wavelengths of the modulators do not include the wavelength #A, the optical transmitter 100 (for example, a controller or a processor in the optical transmitter 100) may adjust an operating wavelength of at least one modulator, so that the at least one modulator (namely, the modulator #A) can modulate the wavelength #A. In S250, the modulator #A modulates the data #A onto the wavelength #A.

Optionally, other modulators in the modulator group to which the modulator #A belongs may further separately modulate other data onto wavelengths other than the wavelength #A in the beam #B.

In a power-intensive calculation process such as artificial intelligence (AI) training, a common computing network solution is a server cluster constructed by using an AI training server on which a graphics processing unit (GPU) is mounted. This server cluster has the following characteristics compared with a common data center with various types of tasks and a short operation time of a single task:

(1) One calculation task is executed at the same time. An execution time is relatively long, and is usually several hours or even days.

(2) The cluster is relatively small. For example, if eight GPUs are typically mounted, 128 servers are usually used to construct the cluster. Each GPU is referred to as one computing node.

(3) An execution algorithm is usually a multi-step iterative operation, requiring communication between nodes.

(4) Calculation requires a low delay.

A network connection of the foregoing server cluster has the following characteristics:

(a) Different calculation tasks require different interconnection relationships between servers, in other words, different network topologies are constructed in the cluster. After being constructed, the network topologies do not change during task execution.

(b) In one calculation task, there are a plurality of calculation steps, and the calculation steps require different network connection relationships between computing nodes, in other words, each calculation step requires one network sub-topology. In addition, a relatively short time is allowed to switch between steps, and is usually less than 100 microseconds.

(c) Data traffic of communication between nodes is relatively large, and a communication time can be effectively reduced by using wider network bandwidth.

(d) Both mathematical model analysis and artificial intelligence training require a large quantity of repeated iterations, in other words, data needs to be repeatedly communicated between nodes, so that a proportion of a network communication time in a task execution time in such a computing application increases, and therefore such a computing application is sensitive to a network delay.

Figure 9:
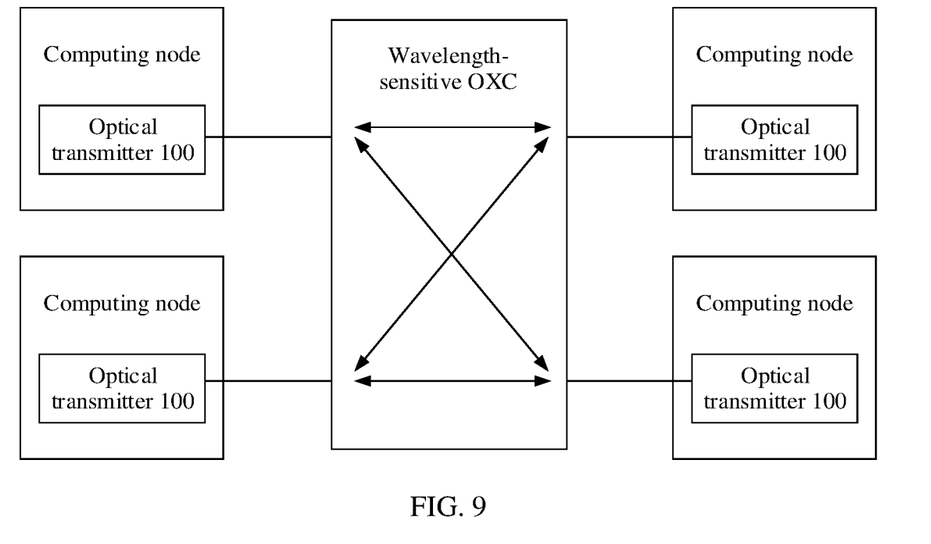
FIG. 9 is a schematic diagram of an example of a computing system applicable to an optical transmitter according to the present disclosure.

The optical transmitter and the optical modulation method provided in the present disclosure may be effectively applied to the foregoing power-intensive computing system. FIG. 9 shows an example of the computing system. As shown in FIG. 9, the computing system includes a plurality of computing nodes. The computing nodes are connected by using a wavelength-sensitive OXC network, and the optical transmitter 100 in the present disclosure is configured on each node.

A plurality of modulator groups 120 is configured, so that a plurality of wavelength signals can be transmitted through a single-fiber port, thereby improving bandwidth efficiency of a physical port in an optical switching network. In addition, a wavelength selector 110 meets a requirement of an extremely short time for switching between steps in an AI algorithm, and also enables a plurality of modulators to share a light source signal, so that a light source with a fixed wavelength can be used, thereby reducing costs, avoiding a wavelength conflict between the plurality of signals, and reducing global network control complexity.

The wavelength selector 110 and the modulator group 120 are integrated into a single chip, so that costs, packaging space, network device complexity, and a control difficulty can be reduced.

In the foregoing method 200, steps performed by a controller or a processor or actions performed by a controller in the foregoing optical transmitter 100 may be automatically performed by the controller. That is, the controller may read a software program in a storage unit, interpret and execute instructions of the software program, and process data of the software program, to control the components of the optical transmitter 100 to perform respective functions, so that the foregoing method 200 is performed.

For example, the controller may be implemented by using a processor, and the processor may include a central processing unit. The central processing unit is mainly configured to control an entire terminal device, execute a software program, and process data of the software program.

It should be understood that, the processor in embodiments of the present disclosure may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It should be further understood that, the memory in embodiments of the present disclosure may be a volatile memory or a nonvolatile memory, or may include both a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. By way of an example but not a limitation, many forms of RAMs can be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or a part of the actions or the method performed by the controller may be implemented by using software, hardware, firmware, or any combination thereof. When software is used, all or a part of the actions or the method performed by the controller may be implemented in a form of a computer program product. The computer program product includes one or more computer instructions or computer programs. When the program instructions or the computer programs are loaded and executed on a computer, the procedure or functions according to embodiments of the present disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that, sequence numbers of the foregoing processes do not mean execution sequences in embodiments of the present disclosure. The execution sequences of the processes should be determined based on functions and internal logic of the processes, and should not constitute any limitation on implementation processes of embodiments of the present disclosure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An optical transmitter, comprising a first controller, a wavelength selector and a plurality of modulator groups, wherein each of the plurality of modulator groups comprises a plurality of modulators, and operating wavelengths of any two modulators of the plurality of modulators in the modulator group are different, wherein
the first controller is configured to determine a first wavelength corresponding to first to-be-sent data;
the wavelength selector is configured to: obtain a first beam comprising a plurality of wavelengths from a multi-wavelength light source, and select some of the plurality of wavelengths included in the first beam to generate a second beam including the first wavelength corresponding to the first to-be-sent data; and
a first modulator in a first modulator group in the plurality of modulator groups is configured to modulate the first to-be-sent data onto the first wavelength in the second beam,
wherein the wavelength selector comprises a plurality of output ports, the plurality of modulator groups is in one-to-one correspondence with the plurality of output ports, and each of the plurality of modulator groups receives a beam from a corresponding output port in the plurality of output ports; and
wherein the wavelength selector comprises at least two operating states, and wavelengths of beams output from a same output port in different operating states are different, and the first controller is further configured to control an operating status of the wavelength selector, so that the wavelength selector is configured to select at least a part of the plurality of wavelengths included in the first beam to generate the second beam including the first wavelength corresponding to the first to-be-sent data.

2. The optical transmitter according to claim 1, wherein the wavelength selector is further configured to output the second beam from an output port corresponding to the first modulator group.

3. The optical transmitter according to claim 2, wherein the first controller is further configured to control an operating status of the wavelength selector, so that wavelengths of beams output from the output port corresponding to the first modulator group comprise the first wavelength.

4. The optical transmitter according to claim 3, wherein the wavelength selector comprises a plurality of filters and an optical switch, the optical switch comprises a plurality of input ports and a plurality of output ports, the plurality of input ports is in one-to-one correspondence with the plurality of filters, each of the plurality of input ports is configured to receive a beam from a corresponding filter in the plurality of filters, the plurality of modulator groups is in one-to-one correspondence with the plurality of output ports, each of the plurality of modulator groups receives a beam from a corresponding output port in the plurality of output ports, the wavelength selector comprises at least two operating states, and wavelengths of beams output from a same output port in different operating states are different, wherein a first filter in the plurality of filters is configured to filter the first beam to generate the second beam; and
the first controller is further configured to control an operating status of the first filter based on an input port corresponding to the first filter, so that the wavelengths of the beams output from the output port corresponding to the first modulator group comprise the first wavelength.

5. The optical transmitter according to claim 4, wherein each of the plurality of filters comprises a plurality of filtering states, and wavelengths of beams output by a same filter in different filtering states comprise different wavelengths; and the optical transmitter further comprises a second controller, configured to control a filtering status of the first filter, so that wavelengths of beams output by the first filter comprise the first wavelength.

6. The optical transmitter according to claim 5, wherein the optical switch comprises a plurality of Mach-Zehnder interferometers.

7. The optical transmitter according to claim 6, wherein the wavelength selector comprises a plurality of Mach-Zehnder interferometers.

8. The optical transmitter according to claim 7, wherein the first modulator comprises a plurality of operating wavelengths that are periodically distributed, and the first wavelength belongs to the plurality of operating wavelengths.

9. The optical transmitter according to claim 8, wherein the optical transmitter further comprises a third controller, configured to adjust a first parameter of the first modulator, so that the plurality of operating wavelengths of the first modulator comprise the first wavelength, and the first parameter comprises an effective refractive index.

10. The optical transmitter according to claim 9, wherein the optical transmitter further comprises the multi-wavelength light source.

11. The optical transmitter according to claim 7, wherein the first controller is further configured to control the operating status of the wavelength selector by controlling voltages applied to the plurality of Mach-Zehnder interferometers included in the wavelength selector.

12. An optical modulation method, comprising:
determining a first wavelength corresponding to to-be-sent data;
processing, by a wavelength selector, a first beam to select some of a plurality of wavelengths included in the first beam to generate a second beam, wherein the second beam comprises the first wavelength corresponding to to-be-sent data; and
modulating the to-be-sent data onto the first wavelength in the second beam by using a first modulator in a plurality of modulators in a first modulator group among a plurality of modulator groups, wherein operating wavelengths of the first modulator comprise the first wavelength and the first wavelength is a wavelength corresponding to a receiving device of the to-be-sent data,
wherein the wavelength selector comprises a plurality of output ports, the plurality of modulator groups is in one-to-one correspondence with the plurality of output ports, and each of the plurality of modulator groups receives a beam from a corresponding output port in the plurality of output ports; and
wherein the wavelength selector comprises at least two operating states, and wavelengths of beams output from a same output port in different operating states are; and
the method further comprises controlling an operating status of the wavelength selector, so that the wavelength selector is configured to select at least a part of the plurality of wavelengths included in the first beam to generate the second beam including the first wavelength corresponding to the first to-be-sent data.

13. The method according to claim 12, further comprising:
controlling the wavelength selector to output the second beam from an output port corresponding to the first modulator group.

14. The method according to claim 13, wherein
the controlling the wavelength selector to output the second beam from an output port corresponding to the first modulator group comprises: controlling an operating status of the wavelength selector, so that wavelengths of beams output from the output port corresponding to the first modulator group comprise the first wavelength.

15. The method according to claim 14, wherein the wavelength selector comprises an optical switch including a plurality of output ports, the plurality of modulator groups is in one-to-one correspondence with the plurality of output ports, and each of the plurality of modulator groups receives a beam from a corresponding output port in the plurality of output ports; and
the method further comprises: controlling the optical switch to output the second beam from the output port corresponding to the first modulator group.

16. The method according to claim 15, wherein the wavelength selector comprises a filter; and
the processing the first beam by using a wavelength selector to generate the second beam comprises:
performing filtering processing on the first beam by using the filter to generate the second beam.

17. The method according to claim 16, wherein the filter comprises a plurality of filtering states, and beams output by a same filter in different filtering states comprise different wavelengths; and
the method further comprises: controlling a filtering status of the filter, so that wavelengths of beams output by the filter comprise the first wavelength.

18. The method according to claim 17, wherein the first modulator comprises a plurality of operating wavelengths that are periodically distributed, and the first wavelength belongs to the plurality of operating wavelengths.

19. The method according to claim 18, further comprising:
adjusting a first parameter of the first modulator, so that the plurality of operating wavelengths of the first modulator comprise the first wavelength, and the first parameter comprises an effective refractive index.

* * * * *

UNITED STATES PATENT AND TRADEMARK OFFICE
CERTIFICATE OF CORRECTION

PATENT NO. : 12,334,984 B2
APPLICATION NO. : 18/147809
DATED : June 17, 2025
INVENTOR(S) : Guangcan Mi et al.

Page 1 of 1

It is certified that error appears in the above-identified patent and that said Letters Patent is hereby corrected as shown below:

In the Claims

Column 18, Claim 12, Line 3, change "are;" to --are different;--.

Signed and Sealed this
Fifteenth Day of July, 2025

Coke Morgan Stewart
*Acting Director of the United States Patent and Trademark Office*